(12) United States Patent
Fang et al.

(10) Patent No.: US 8,113,726 B2
(45) Date of Patent: Feb. 14, 2012

(54) DISPLAY DEVICE

(75) Inventors: Chuan Hui Fang, Hong Kong (CN); Li Sheng Liu, Shenzhen (CN); Zhi Song Wang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 12/730,585

(22) Filed: Mar. 24, 2010

(65) Prior Publication Data

US 2010/0247090 A1  Sep. 30, 2010

(30) Foreign Application Priority Data

Mar. 24, 2009  (CN) .......................... 2009 1 0106347

(51) Int. Cl.
*G03B 17/00* (2006.01)
(52) U.S. Cl. ....................................................... 396/428
(58) Field of Classification Search ................... 396/428; 348/373, 374, 219.1
See application file for complete search history.

(56) References Cited

U.S. PATENT DOCUMENTS

| 6,078,440 | A  | * | 6/2000 | Ueyama ......................... 359/824 |
| 6,384,515 | B1 | * | 5/2002 | Ganor et al. .................. 310/328 |
| 6,727,954 | B1 | * | 4/2004 | Okada et al. .................. 348/374 |
| 7,907,171 | B2 | * | 3/2011 | Miyamoto et al. .......... 348/207.1 |

FOREIGN PATENT DOCUMENTS

| CN | 201188587 Y | 1/2009 |
| CN | 101539655 A | 9/2009 |

* cited by examiner

*Primary Examiner* — W. B. Perkey
(74) *Attorney, Agent, or Firm* — Muncy, Geissler, Olds & Lowe, PLLC

(57) ABSTRACT

A display device comprises a housing, an image capture device and a screen mounted to the housing. A drive platform is mounted to the housing. The drive platform comprises: a rotatable part to which the image capture device is mounted; a stationary part having a chamber to receive the rotatable part and a capture window to expose the image capture device; and at least one piezoelectric motor which rotates the rotatable part to pan and tilt the image capture device within the capture window.

7 Claims, 2 Drawing Sheets

DISPLAY DEVICE

CROSS REFERENCE TO RELATED APPLICATIONS

This non-provisional patent application claims priority under 35 U.S.C. §119(a) from Patent Application No. 200910106347.3 filed in The People's Republic of China on Mar. 24, 2009.

FIELD OF THE INVENTION

This invention relates to a display device, and in particular to a display device with an image capture device, such as a personal computer (PC) monitor having a camera. (built-in web cam)

BACKGROUND OF THE INVENTION

Some display devices have integrated cameras. For example, a camera is integrated into a laptop computer's monitor to capture video and then save the video to the laptop. In some cases, the camera is built inside the monitor's housing and is stationary with respect to the monitor. In the case of a stationary camera design, a user has to turn the monitor to adjuster the camera's position. To overcome this problem, in other cases, the camera is mounted to a monitor by a rotatable holder. In the case of a rotatable holder design, a user can manually turn the holder to adjuster the camera's position without moving the monitor. However, the manual operation is not convenient and the position of the camera can not be controlled remotely. In addition, as the rotatable holder as well as the camera is outside the monitor, it is likely to be accidentally broken.

SUMMARY OF THE INVENTION

Hence there is a desire for a display device with an electrically controllable image capture device.

This is achieved in the present invention by mounting the image capture device to a drive device which is integrated with a display device.

Accordingly, in one aspect thereof, the present invention provides a display device comprising a housing, a screen mounted to the housing, and an image capture device, and a drive platform mounted to the housing, the drive platform comprising: a rotatable part to which the image capture device is mounted; and at least one piezoelectric (PZT) motor arranged to rotate the rotatable part about two axes, to move the image capture device with respect to the housing.

Preferably, the rotatable part is like a sphere, and the drive platform further comprises a stationary part mounted to the housing, the stationary part comprising a spherical chamber in which the rotatable part is received and a capture window through which the image capture device is exposed, each of the at least one piezoelectric motor comprising a piezoelectric element having a friction nub which contacts and drives the rotatable part to move the image capture device within the capture window.

Preferably, the drive platform comprises at least one spring to urge the at least one piezoelectric motor so that the friction nub elastically contacts the rotatable part.

Preferably, the at least one piezoelectric motor and at least one spring are disposed inside the stationary part so that the drive platform is an independent functional module.

Preferably, the drive platform comprises two piezoelectric motors each of which has one piezoelectric element, the two piezoelectric elements being disposed on opposite sides of a plane passing through a spherical center of the rotatable part, so that the rotatable part rotates about a first axis of said two axes when the two friction nubs move in an identical direction, and the rotatable part rotates about a second axis of said two axes when the two friction nubs move in opposite directions.

Preferably, the two piezoelectric elements of the two piezoelectric motors are substantially parallel, the plane defined by the two piezoelectric elements passing through the spherical center of the rotatable part.

Preferably, the two piezoelectric elements are symmetrically located about a plane which passes through the spherical center of the rotatable part.

Preferably, the two piezoelectric elements are symmetrically located about a plane which passes through the spherical center of the rotatable part and the center of the capture window.

Preferably, the two piezoelectric elements of the two piezoelectric motors are located in a plane which passes through the spherical center of the rotatable part, the two piezoelectric elements forming an included angle ranging from 0 to 180 degrees.

Alternatively, the drive platform comprises one two-dimension piezoelectric motor, the piezoelectric motor comprises a friction nub which can move within two planes mutually perpendicular to each other, the friction nub being arranged to rotate the rotatable part about a first axis and a second axis of said two axes, to move the image capture device in pan and/or tilt directions.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
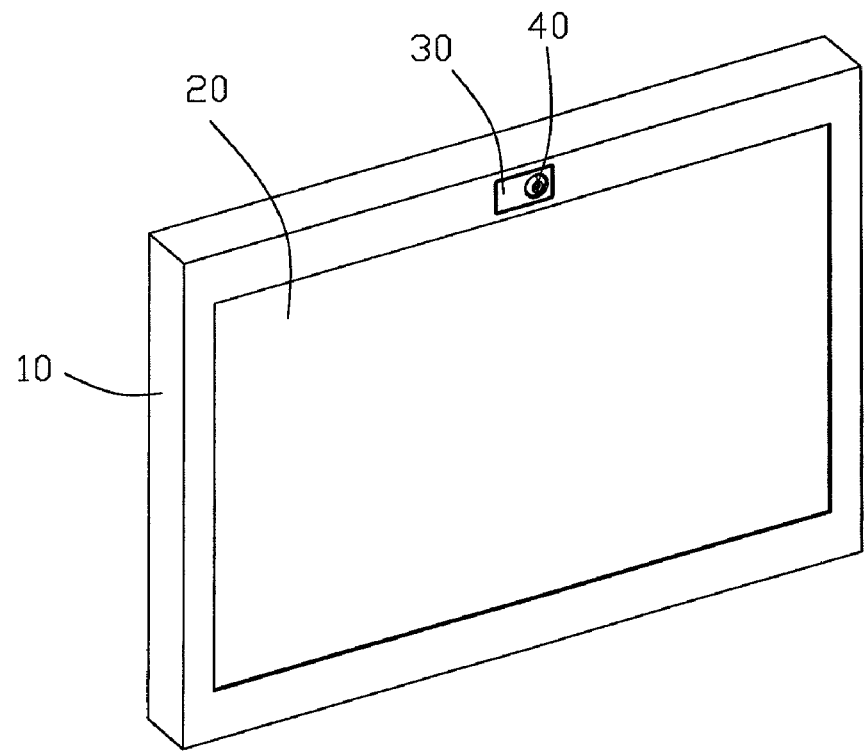
FIG. 1 illustrates a display device according to a preferred embodiment of the present invention.

FIG. 1 illustrates a display device. The display device comprises a housing 10, a screen 20 held by the housing 10, a drive platform 30 fixed to the housing 10, and an image capture device 40 mounted to the drive platform 30. The drive platform 30 is preferably fixed inside the housing 10. A small window is formed in the housing 10 to expose the image capture device 40. Preferably, the image capture device 40 does not protrude through the small window so that the image capture device is protected by the housing 10.

Figure 2:
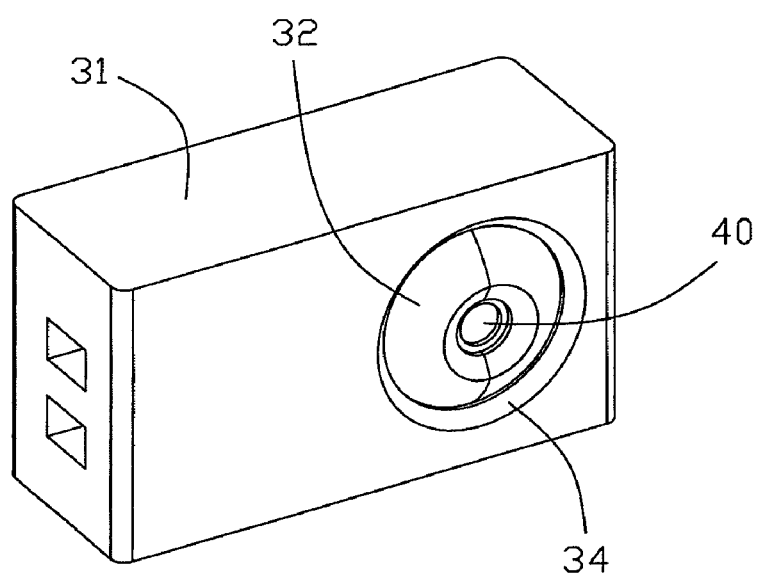
FIG. 2 illustrates a drive platform and a camera, which are parts of the display device of FIG. 1.

FIG. 2 illustrates the drive platform 30 and the image capture device 40. The drive platform 30 comprises a stationary part 31 and a rotatable part 32. The rotatable part 32 is like a sphere, and is received in a spherical chamber formed inside the stationary part 31. The stationary part 31 and the rotatable part 32 form a spherical kinematics pair system. The rotatable part 32 can roll, pivot or otherwise move inside the spherical chamber with respect to the stationary part 31. The image capture device 40 is fixed to the rotatable part 32 and moves with the rotatable part 32. The spherical chamber has a capture window 34 to expose the image capture device 40 and a part of the rotatable part 32. The stationary part 31 is mounted to the housing 10 of the display device with the capture window 34 confronting a targeted area, so that the image capture device 40 can capture the scene within the targeted area.

Figure 3:
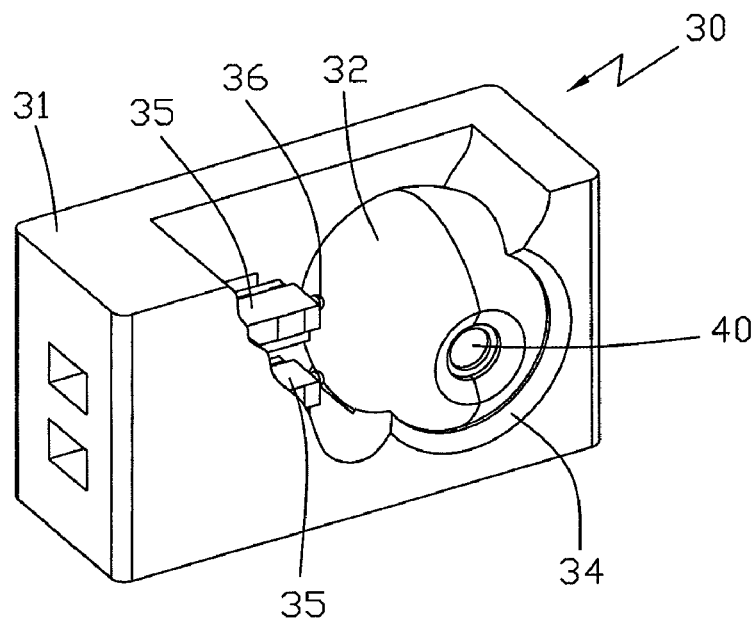
FIG. 3 illustrates an inner structure of the drive platform of FIG. 2.

FIG. 3 illustrates the inner structure of the drive platform. The drive platform comprises two piezoelectric (PZT) motors, each of which comprises a piezoelectric (PZT) element 35. Each of the PZT elements 35 comprises a friction nub 36 at one of its ends. A spring presses against the other end of the PZT element 35 to urge the friction nub 36 into contact with the rotatable part 32. When the PZT elements 35 are activated, the friction nubs move within a plane. The tips of the nubs may follow an elliptical path and move either clockwise or anticlockwise, depending on how the element is activated. In the preferred embodiment, the two PZT elements 35 are located in a first plane which passes through the spherical center of the rotatable part 32. The two PZT elements 35 are substantially parallel to, and symmetrically located with respect to a second plane which is perpendicular to the first plane and passes through the spherical center of the rotatable part 32. Therefore, the rotatable part 32 can turn steadily when being driven by the two friction nubs 36.

In the preferred embodiment, the first plane defined by the two PZT elements is substantially parallel to the capture window 34. With the driving force of the two friction nubs 36, the rotatable part 32 can turn in two directions perpendicular to each other. In other words, pan movement and tilt movement of the image capture device 40 is achieved. Movement of the rotatable part depends on the movement of the friction nubs. With the PZT elements arranged so that the frictional nubs of both elements move in respective planes which are perpendicular to the capture window, the pan motion is achieved by activating both frictional nubs in the same direction, either clockwise or counter-clockwise. Tilt motion is achieved by activating the elements so that the frictional nubs move in opposite directions, i.e., one clockwise and the other counter-clockwise. This causes the rotatable part to pivot about an axis passing between the two elements, a horizontal axis as shown in FIG. 3.

The operation of the motors can be described in another way. Both of the PZT motors are one-dimension PZT motors, meaning that the friction nub moves in a single plane. For simplicity, planes parallel to the second plane defined above are called latitude planes. The two PZT elements 35 are located in two separate latitude planes. Each friction nub 36 moves within a corresponding latitude plane. Looking down from above, when both of the two friction nubs 36 move in an elliptical path in a clockwise (CW) direction, the rotatable part 32 will rotate in a counter-clockwise (CCW) direction, and vice versa. In other words, when the two friction nubs move in the same direction such as CW or CCW, the rotatable part 32 will rotate about an axis which is perpendicular to the latitude planes, and pan movement of the image capture device 40 is achieved.

In the other hand, when one of the two friction nubs 36 moves in a clockwise (CW) direction and the other nub 36 moves in a counter-clockwise (CCW) direction, the rotatable part 32 will rotate upwardly or downwardly about a horizontal axis. In other words, tilt movement of the image capture device 40 is achieved. For example, when the friction nub 36 of the upper PZT element 35 moves in a CW direction, and the friction nub 36 of the lower PZT element 35 moves in a CCW direction, the image capture device 40 will rotate downwardly, and vice versa. With the combination of the pan movement and the tilt movement, the image capture device 40 can move to any position within the capture window 40.

In the preferred embodiment, the display device is a monitor of a laptop computer. The image capture device 40 is a CCD camera. Video signals captured by the CCD camera are sent and/or saved to the laptop. Control module of PZT motors is connected to the laptop. A user can control the movement of the CCD camera with a graphical user interface (GUI) of software installed in the laptop. One method of controlling a PZT motor is disclosed in Patent Application No. 200810066114.0 filed in The People's Republic of China on Mar. 19, 2008, which is hereby incorporated by reference in its entirety.

In the preferred embodiment, the two PZT motors are mounted to the stationary part 31 so that the drive platform is an independent functional module. The independent functional module is easily integrated to a variety of display devices, such as TV sets, monitors of personal computers, mobiles, etc.

In the above mentioned embodiment, the two PZT elements are substantially parallel. However, it should be understood that the two PZT elements can form an included angle ranging from 0 to 180 degrees, such as 60 degrees, 90 degrees, 120 degrees, etc. Preferably, the plane defined by the two PZT elements passes through the spherical center of the rotatable part 32. Both of the PZT elements are located at one side of a plane which passes through spherical center of the rotatable part 32. It should be understood that the image capture device 40 can move to any position within the capture window with the combination of pan movement and tilt movement.

In the above mention embodiments, both of the PZT motors are one-dimension PZT motors. Each of the friction nubs 36 of the PZT elements moves within a single plane. A two-dimension PZT motor is disclosed in Patent Application No. 200820092375.5 filed in The People's Republic of China on Mar. 3, 2008, which is hereby incorporated by reference in its entirety.

As is mentioned, when the PZT element 35 is activated, the friction nub 36 will vibrate. For a one-dimension (1D) PZT motor, the friction nub 36 moves within a single plane. In every cycle of motion, the friction nub 35 moves in a first direction in the first half cycle and moves in an opposite direction in the second half cycle of the motion. Therefore, a one-dimension PZT motor can drive a driven member to rotate about a single axis. For a two-dimension (2D) PZT motor, the friction nub can move within two planes mutually perpendicular to each other. A two-dimension PZT motor can drive a driven member to move about two perpendicular axes to create a spherical like motion using a single PZT motor.

Figure 4:
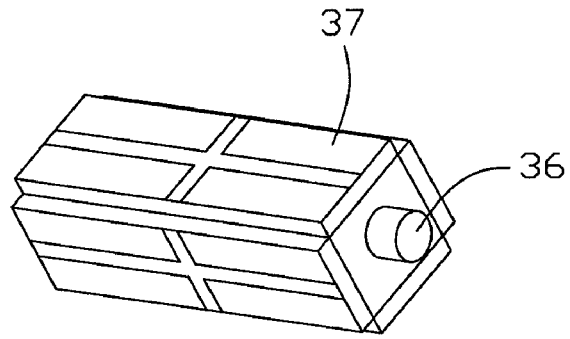
FIG. 4 illustrates a two-dimensional (2D) piezoelectric motor according to another embodiment of the present invention.
Figure 5:
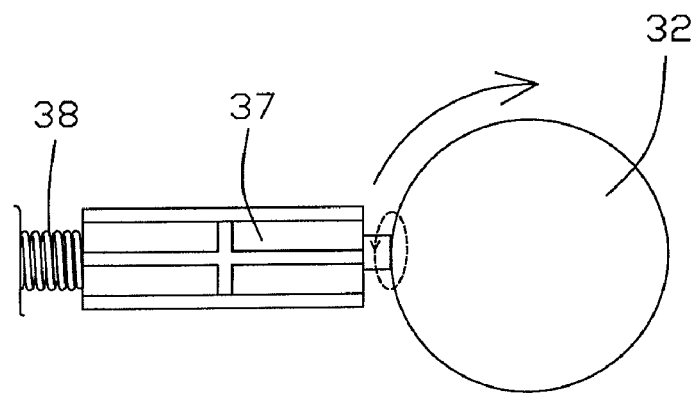
FIG. 5 illustrates the 2D piezoelectric motor and a rotatable part of the drive platform.

An element 37 of a two-dimension PZT motor is illustrated in FIG. 4. Friction nub 36 of the two dimension PZT element 37 can move in two planes perpendicularly to each other. FIG. 5 illustrates a drive platform according to an alternative embodiment of the present invention. The drive platform uses a single two-dimension PZT motor, rather than two one-dimension PZT motors. A spring 38 is located at one of the PZT element to urge the friction nub 36 into contact with the rotatable part 32. The drive platform is simple and compact since only one PZT motor is used.

In the description and claims of the present application, each of the verbs "comprise", "include", "contain" and "have", and variations thereof, are used in an inclusive sense, to specify the presence of the stated item but not to exclude the presence of additional items. The term image capture device includes devices which capture still images such as photos and moving images such as videos.

Although the invention is described with reference to one or more preferred embodiments, it should be appreciated by those skilled in the art that various modifications are possible. Therefore, the scope of the invention is to be determined by reference to the claims that follow.

The invention claimed is:

1. A display device comprising: a housing; a screen mounted to the housing; an image capture device; and a drive platform mounted to the housing, the drive platform comprising:
   a rotatable part to which the image capture device is mounted, the rotatable part being like a sphere;
   a stationary part mounted to the housing, the stationary part comprising a spherical chamber in which the rotatable part is received and a capture window through which the image capture device is exposed, and
   two piezoelectric motors arranged to rotate the rotatable part about two axes, to move the image capture device with respect to the housing, each piezoelectric motor comprising a piezoelectric element having a friction nub which contacts and drives the rotatable part to move the image capture device within the capture window;
   wherein the two piezoelectric elements are disposed on opposite sides of a plane passing through a spherical center of the rotatable part, so that the rotatable part rotates about a first axis of said two axes when the two friction nubs move in an identical direction, and the rotatable part rotates about a second axis of said two axes when the two friction nubs move in opposite directions.

2. The display device of claim 1, wherein the drive platform comprises two springs to urge the two piezoelectric motors so that the friction nubs elastically contact the rotatable part.

3. The display device of claim 2, wherein each piezoelectric motor and each spring are disposed inside the stationary part so that the drive platform is an independent functional module.

4. The display device of claim 1, wherein the two piezoelectric elements of the two piezoelectric motors are substantially parallel, the plane defined by the two piezoelectric elements passing through the spherical center of the rotatable part.

5. The display device of claim 1, wherein the two piezoelectric elements are symmetrically located about a plane which passes through the spherical center of the rotatable part.

6. The display device of claim 1, wherein the two piezoelectric elements are symmetrically located about a plane which passes through the spherical center of the rotatable part and the center of the capture window.

7. The display device of claim 1, wherein the two piezoelectric elements of the two piezoelectric motors are located in a plane which passes through the spherical center of the rotatable part, the two piezoelectric elements forming an included angle ranging from 0 to 180 degrees.

\* \* \* \* \*